Patented Dec. 5, 1933

1,938,253

UNITED STATES PATENT OFFICE 1,938,253

ADDITION PRODUCTS OF THE PYRIDINE SERIES AND PROCESS OF MAKING SAME

Max Hartmann, Riehen, near Basel, and Max Seiberth, Basel, Switzerland, assignors to the firm of Society of Chemical Industry in Basle, Basel, Switzerland No Drawing. Application February 27, 1932, Serial No. 595,652, and in Switzerland March 7, 1931

16 Claims. (Cl. 260—42)

This invention relates to new addition products of the pyridine series. It comprises the new compounds themselves and the process of making same.

The new addition products of the pyridine series are made by causing a pyridine carboxylic acid or an acid derivative or a substitution product thereof to react with a salt of an alkaline earth metal in solid or dissolved form.

Such addition products are formed for instance by nicotinic acid, picolinic acids, the hydroxy- halogen- or amino-pyridine carboxylic acids, as well as by the esters, halides, amides, anhydrides or salts of these acids. As the salts of the alkaline earth metals there may be used the salts of these metals with hydro-halogen acids, sulfocyanic acid or with organic acids, for example benzoic acids, salicylic acid, aromatic sulfonic acids or the like.

The new compounds are generally formed by the combination of one molecule of an alkaline earth metal salt with one or more molecules of the pyridine compound. Thus, for example, there may be obtained from nicotinic acid di-ethyl-amide and calcium sulfocyanide addition products which contain, according to the relative proportions used, one or two molecules of the diethyl-amide for each molecule of the calcium salt. The reaction occurs in most cases even in the cold and with a small evolution of heat. It may be conducted by directly mixing the constituents or it may be conducted in solution.

Independently of whether the parent material is an oily or solid body, the new addition products form solid crystalline powders which can be recrystallized from water or from organic solvents, from which it follows that the compounds are true addition products.

The yields are practically quantitative.

The new addition products are capable of various applications. They may serve simply for isolating and purifying the pyridine compounds in question. But the addition products themselves are also of importance therapeutically. Oily compounds such as nicotinic acid diethyl-amide, may easily be converted by the new reaction into solid form, which is of importance in connection with the administration per os of such medicaments. Furthermore by suitable combination of the constituents, their properties may be enhanced or improved.

The new compounds are intended therefore to serve both for the isolation and purification of the pyridine compounds and for therapeutic purposes.

The following examples illustrate the invention, the parts being by weight except where otherwise stated:—

Example 1

24.6 parts of nicotinic acid are dissolved in 500 parts by volume of alcohol at the temperature of the water bath and there is added to the solution an alcoholic solution of 11.1 parts of calcium chloride. The new addition product at once separates in the form of fine white crystals. The reaction is completed by heating.

After cooling the reaction mixture the product is separated by filtration; it is a nicotinic acid-calcium chloride which contains two molecules of nicotinic acid for each molecule of calcium chloride. By evaporating the mother liquor a further quantity of the addition product can be recovered. It is very sparingly soluble in alcohol, acetone and ethyl acetate but easily soluble in water.

Example 2

To a hot solution of 24.6 parts of picolinic acid is added a solution of 11.1 parts of calcium chloride in a small quantity of alcohol. The whole is boiled for a short while and then cooled, whereupon the addition product separates. It contains two molecules of picolinic acid for each molecule of calcium chloride and forms white crystals which are insoluble in acetone and ethyl acetate but freely soluble in water.

Example 3

A hot alcoholic solution of 24 parts of α-hydroxypyridine-β-carboxylic acid is mixed with an alcoholic solution of 11 parts of calcium chloride. The new compound separates even whilst the solution is hot in the form of a white crystalline powder which is practically insoluble in alcohol and acetone but soluble in water. It contains two molecules of the hydroxy-nicotinic acid for each molecule of calcium chloride.

Example 4

28 parts of nicotinic acid chloride are well stirred together with 11 parts of finely powdered calcium chloride. The reaction commences at ordinary temperature and is completed by heating on the water bath, whereby the reaction mixture becomes completely solid. It consists of the addition product of nicotinic acid chloride and calcium chloride and contains two molecules of nicotinic acid chloride for each molecule of calcium chloride.

Example 5

151 parts of nicotinic acid ethyl ester are introduced into a solution of 111 parts of calcium chloride in 500 parts of alcohol. After the whole has been heated for a short time the addition product separates in the form of white crystals. It contains one molecule of the ester for each molecule of calcium chloride. It may be recrystallized from alcohol; it is insoluble in acetone and very sparingly soluble in ethyl acetate.

Example 6

356 parts of nicotinic acid diethylamide are well stirred together with 111 parts of finely powdered calcium chloride. The reaction commences with spontaneous evolution of heat and is completed by heating on the water bath. The reaction mixture solidifies to a mass which when recrystallized from alcohol forms white crystals. The new addition product contains two molecules of nicotinic acid diethylamide for each molecule of calcium chloride; it is soluble in water and in ethyl acetate but insoluble in acetone.

Example 7

229 parts of calcium sulfocyanide containing water of crystallization and corresponding with 156 parts of the anhydrous salt are dissolved in 230 parts of water and the solution is mixed with 356 parts of nicotinic acid diethylamide. When dissolution has occurred a double compound containing two molecules of nicotinic acid diethylamide for each molecule of calcium sulfocyanide commences to crystallize with evolution of heat. The whole is heated for a short time on the water bath, then cooled and the white crystals are separated by filtration. The di-(nicotinic acid diethylamide)-calcium sulfo-cyanide crystallizes with two molecules of water of crystallization. The anhydrous compound is obtained by heating the hydrated compound under reduced pressure; it may be recrystallized from absolute alcohol and forms white crystals which are soluble in alcohol and in water and sparingly soluble in acetone and in ethyl acetate. Neither the anhydrous addition product nor the compound containing water of crystallization is deliquescent.

Example 8

35.6 parts of nicotinic acid diethylamide and 20 parts of calcium bromide are dissolved in water and the solution is evaporated to dryness. The residue can be recrystallized from alcohol. It consists of di-(nicotinic acid diethylamide)-calcium bromide, a white crystalline powder insoluble in ethyl-acetate and in acetone but soluble in water.

Example 9

An alcoholic solution of 107 parts of nicotinic acid diethylamide and 88 parts of calcium iodide is evaporated under reduced pressure. The residue, di-(nicotinic acid diethylamide)-calcium iodide, forms when recrystallized from acetone white crystals which are very sparingly soluble in ethyl acetate but freely soluble in water and in alcohol.

Example 10

178 parts of nicotinic acid diethylamide and 314 parts of calcium salicylate are dissolved together in water and the solution is evaporated to dryness on the water bath. The residue, nicotinic acid diethylamide-calcium salicylate, is a white powder which is soluble in water, in alcohol, in acetone and in ethyl acetate. It contains one molecule of nicotinic acid diethylamide for each molecule of calcium salicylate. The new compound has the following formula

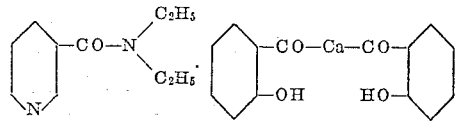

Example 11

By adding 178 parts of nicotinic acid diethylamide to a solution of 95 parts of magnesium chloride in 3000 parts by volume of alcohol, heating the whole for a short time on the water bath and distilling the alcohol, there is obtained a new addition product containing one molecule of nicotinic acid diethylamide for each molecule of magnesium chloride. It is a white crystalline powder which is soluble in water and in alcohol and insoluble in acetone. The new compound has the following formula

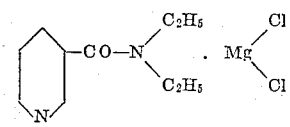

Example 12

An aqueous solution of 178 parts of nicotinic acid diethylamide and 158 parts of strontium chloride is evaporated to dryness. The remaining solid addition product contains one molecule of nicotinic acid diethylamide for each molecule of strontium chloride. It is insoluble in alcohol. The new compound has the following formula

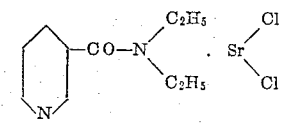

Example 13

229 parts of calcium sulfocyanide containing water of crystallization and corresponding with 156 parts of the anhydrous salt are dissolved in acetone and the solution is mixed with 356 parts of nicotinic acid methyl propylamide. After dissolution has occurred the new addition product, di-(nicotinic acid methyl propylamide)-calcium sulfocyanide, crystallizes in the form of fine white crystals which are soluble in alcohol, in ethyl acetate and in water.

Example 14

23 parts of calcium sulfocyanide containing water of crystallization and corresponding with 15 parts of the anhydrous salt are dissolved in alcohol together with 35 parts of picolinic acid diethylamide (an oil soluble in water; boiling point 120° C. under 3 millimetres pressure). The whole is heated for a short time on the water bath and the alcohol is then distilled. The di-(picolinic acid diethylamide)-calcium sulfocyanide thus obtained is a fine crystalline white powder which is very freely soluble in water, in alcohol, in acetone and in ethyl acetate.

Example 15

22.9 parts of crystallized calcium sulfocyanide, corresponding with 15.6 parts of the anhydrous salt, are dissolved in 50 parts by volume of alcohol together with 53 parts of collidinedicarboxylic acid diethylester (2:4:6-trimethylpyridine-3:5-dicarboxylic acid diethylester). The whole is heated for a short time on the water bath and the alcohol is then distilled. The residue, a tough, transparent mass, solidifies after a short time to a crystalline state, and is then washed with ether. The crystalline powder thus obtained consists of di-(collidinedicarboxylic acid diethylester)-calcium sulfocyanide which is easily soluble in alcohol, acetone and acetic ether.

*Example 16*

An alcoholic solution of 111 parts of calcium chloride is mixed with an alcoholic solution of 122 parts of nicotinic acid amide. After a short boil in a reflux apparatus the nicotinic acid amide-calcium chloride addition product consisting of 1 mol of nicotinic acid amide and 1 mol of calcium chloride crystallizes in white crystals. It is easily soluble in water, sparingly soluble in alcohol and insoluble in acetone. The new compound has the following formula

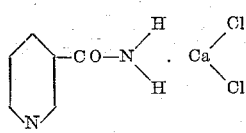

What we claim is:—

1. A process for the manufacture of addition products of the pyridine series by causing at least one molecule of a pyridine compound of the formula

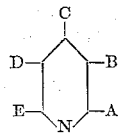

wherein one of the letters A or B or both of the letters B and D stand for a group of the formula —COX, X meaning halogen, OR or

R, R₁ and R₂ standing for hydrogen or alkyl and wherein the other letters A to E stand for hydrogen, A also standing for hydroxy and A, C and E for methyl, to react with one molecule of a water-soluble salt of an alkaline earth metal.

2. A process for the manufacture of addition products of the pyridine series by causing at least one molecule of a pyridine compound of the formula

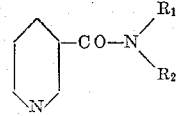

R₁ and R₂ standing for hydrogen or alkyl, to react with one molecule of a water-soluble salt of an alkaline earth metal.

3. A process for the manufacture of addition products of the pyridine series by causing at least one molecule of nicotinic acid diethylamide of the formula

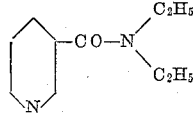

to react with one molecule of a water-soluble salt of an alkaline earth metal.

4. A process for the manufacture of addition products of the pyridine series by causing at least one molecule of nicotinic acid diethylamide of the formula

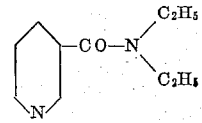

to react with calciumsulfocyanide.

5. A process for the manufacture of addition products of the pyridine series by causing two molecules of a pyridine compound of the formula

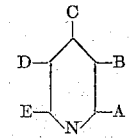

wherein one of the letters A or B or both the letters B and D stand for a group of the formula —COX, X meaning halogen, OR or

R, R₁ and R₂ standing for hydrogen or alkyl and wherein the other letters A to E stand for hydrogen, A also standing for hydroxy and A, C and E for methyl, to react with one molecule of a water-soluble salt of an alkaline earth metal.

6. A process for the manufacture of addition products of the pyridine series by causing two molecules of a pyridine compound of the formula

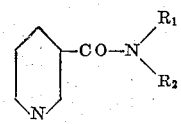

R₁ and R₂ standing for hydrogen or alkyl, to react with one molecule of a water-soluble salt of an alkaline earth metal.

7. A process for the manufacture of addition products of the pyridine series by causing two molecules of nicotinic acid diethylamide of the formula

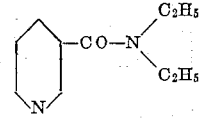

to react with one molecule of a water-soluble salt of an alkaline earth metal.

8. A process for the manufacture of an addition product of the pyridine series by causing two molecules of nicotinic acid diethylamide of the formula

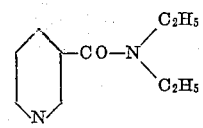

to react with calciumsulfocyanide.

9. Addition products of one molecule of a water-soluble salt of an alkaline earth metal with at least one molecule of a pyridine compound of the formula

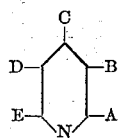

wherein one of the letters A or B or both the letters B and D stand for a group of the formula —COX, X meaning halogen, OR or

R, R₁ and R₂ standing for hydrogen or alkyl and wherein the other letters A to E stand for hydrogen, A also standing for hydroxy and A, C and E for methyl, which products form white crystals and are useful in therapeutics.

10. Addition products of one molecule of a water-soluble salt of an alkaline earth metal with at least one molecule of a pyridine compound of the formula

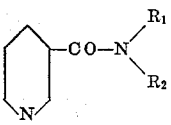

R₁ and R₂ standing for hydrogen or alkyl, which products form white crystals and are useful in therapeutics.

11. Addition products of one molecule of a water-soluble salt of an alkaline earth metal with at least one molecule of nicotinic acid diethylamide of the formula

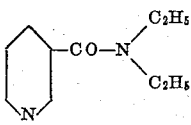

which products form white crystals and are useful in therapeutics.

12. Addition products of one molecule of calcium sulfocyanide with at least one molecule of nicotinic acid diethylamide of the formula

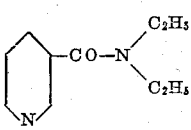

which products form white crystals and are useful in therapeutics.

13. Addition products of one molecule of a water-soluble salt of an alkaline earth metal with two molecules of a pyridine compound of the formula

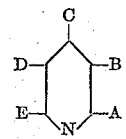

wherein one of the letters A or B or both the letters B and D stand for a group of the formula —COX, X meaning halogen, OR or

R, R₁ and R₂ standing for hydrogen or alkyl and wherein the other letters A to E stand for hydrogen, A also standing for hydroxy and A, C and E for methyl, which products form white crystals and are useful in therapeutics.

14. Addition products of one molecule of a water-soluble salt of an alkaline earth metal with two molecules of a pyridine compound of the formula

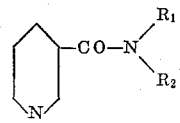

R₁ and R₂ standing for hydrogen or alkyl, which products form white crystals and are useful in therapeutics.

15. Addition products of one molecule of a water-soluble salt of an alkaline earth metal with two molecules of nicotinic acid diethylamide of the formula

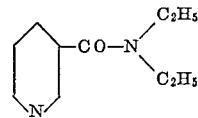

which products form white crystals and are useful in therapeutics.

16. An addition product of one molecule of calcium sulfocyanide with two molecules of nicotinic acid diethylamide which product corresponds to the formula

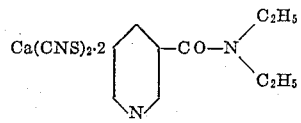

and forms a white crystalline powder, stable in air, freely soluble in water and alcohol, sparingly soluble in acetone and ethyl acetate, crystallizing with two molecules of water, said product being useful in therapeutics.

MAX HARTMANN.
MAX SEIBERTH.